(12) United States Patent
Xi et al.

(10) Patent No.: US 8,831,589 B2
(45) Date of Patent: Sep. 9, 2014

(54) METHOD AND SYSTEM FOR NOTIFYING UPDATE INFORMATION TO CORE NETWORK

(75) Inventors: Jin Xi, Shenzhen (CN); Shengming Wang, Shenzhen (CN); Lei Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 253 days.

(21) Appl. No.: 13/634,876

(22) PCT Filed: Jan. 19, 2011

(86) PCT No.: PCT/CN2011/070386
§ 371 (c)(1),
(2), (4) Date: Sep. 14, 2012

(87) PCT Pub. No.: WO2012/041022
PCT Pub. Date: Apr. 5, 2012

(65) Prior Publication Data
US 2013/0012192 A1 Jan. 10, 2013

(30) Foreign Application Priority Data

Sep. 28, 2010 (CN) .......................... 2010 1 0294452

(51) Int. Cl.
*H04W 4/00* (2009.01)
*H04W 36/00* (2009.01)
*H04W 84/04* (2009.01)

(52) U.S. Cl.
CPC ........ *H04W 36/0055* (2013.01); *H04W 84/045* (2013.01)
USPC ......... 455/422.1; 455/436; 455/444; 370/331

(58) Field of Classification Search
CPC .......................... H04W 36/0055; H04W 84/045
USPC ............. 455/435.1–435.3, 436–444; 370/331
See application file for complete search history.

(56) References Cited

U.S. PATENT DOCUMENTS

| | | | |
|---|---|---|---|
| 8,509,200 B2 * | 8/2013 | Li et al. .......................... | 370/338 |
| 2011/0281584 A1 * | 11/2011 | Sander et al. ................. | 455/436 |
| 2012/0230296 A1 * | 9/2012 | Hapsari et al. ................ | 370/331 |

FOREIGN PATENT DOCUMENTS

| | | |
|---|---|---|
| CN | 101742582 A | 6/2010 |
| CN | 101790221 A | 7/2010 |
| CN | 101800976 A | 8/2010 |

OTHER PUBLICATIONS

International Search Report in international application No. PCT/CN2011/070386, mailed on Jul. 7, 2011.
English Translation of the Written Opinion of the International Search Authority in international application No. PCT/CN2011/070386, mailed on Jul. 7, 2011.

* cited by examiner

*Primary Examiner* — Wayne Cai
(74) *Attorney, Agent, or Firm* — Oppedahl Patent Law Firm LLC

(57) ABSTRACT

The disclosure provides a method for notifying update information to a Core Network (CN), the method includes: a target access network element sends Close Subscriber Group (CSG) information of a cell that a User Equipment (UE) currently accesses to the CN after the UE is handed over from a source access network element to the target access network element; or the UE sends the CSG information of the cell that the UE currently accesses to the CN after receiving an instruction from the target access network element. According to the technical solution of the disclosure, when the CN does not participate in the handover process, the CSG information of the cell that the UE currently accesses is notified to the CN.

18 Claims, 7 Drawing Sheets

---

401, after the UE is handed over from the source access network element to the target access network element, the target access network element sends the CSG information of the cell that the UE currently accesses to the CN; or, after receiving the indication from the target access network element, the UE sends the CSG information of the cell that the UE currently accesses to the CN 402, the CN stores the CSG information of the cell that the UE currently accesses

Fig. 3

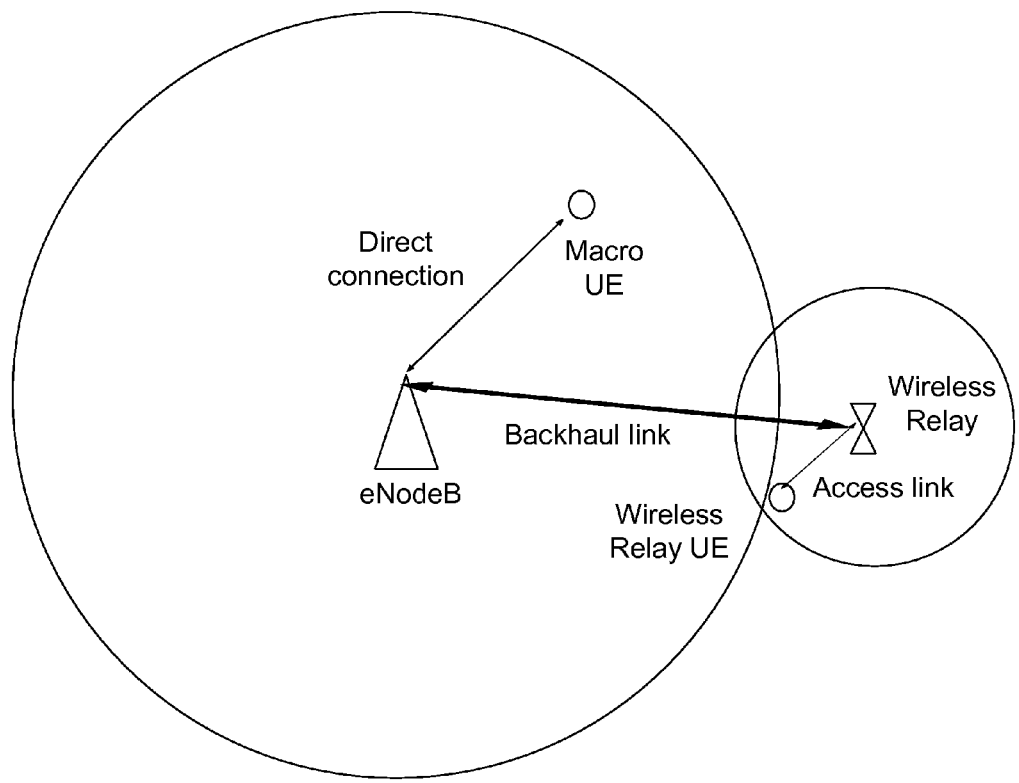

Fig. 4

401, after the UE is handed over from the source access network element to the target access network element, the target access network element sends the CSG information of the cell that the UE currently accesses to the CN; or, after receiving the indication from the target access network element, the UE sends the CSG information of the cell that the UE currently accesses to the CN 402, the CN stores the CSG information of the cell that the UE currently accesses

METHOD AND SYSTEM FOR NOTIFYING UPDATE INFORMATION TO CORE NETWORK

TECHNICAL FIELD

The disclosure relates to a cellular wireless communication system, and in particular to a method and system for notifying update information to a Core Network (CN).

BACKGROUND

The Home (evolved) NodeB (H(e)NB) is a small low-power base station (eNB), which is deployed in the indoor locations such as homes, offices and the like. The main role that the H(e)NB plays is to provide a higher service rate for users, reduce the charge for the usage of the high-rate service, and make up for the inadequate coverage of the existing distributed cellular wireless communication system. The H(e)NB is advantaged in that: it is economical and practical, adaptable and convenient, has low output power, can be instantly plugged and used, and the like.

FIG. 1 shows a schematic diagram illustrating network topology of an HeNB in the prior art, and FIG. 2 shows a schematic diagram illustrating network topology of an HNB in the prior art; as shown in FIG. 1 and FIG. 2, the users of the H(e)NB are connected to the CN via a Home (evolved) NodeB Access Network (H(e)NBAN), wherein the H(e)N-BAN is composed of the H(e)NB and a Home (evolved) NodeB Gateway (H(e)NB GW); wherein, the H(e)NB GW is mainly configured to process the registration and access control for the H(e)NB, verify the H(e)NB, and take charge of exchanging data between the CN and the H(e)NB. In addition, a H(e)NB Management System (H(e)MS) performs operation maintenance and management for the H(e)NB, and configures and controls the H(e)NB according to the demands of operators, wherein, the most important is to realize a function of configuration for the H(e)NB; the configured contents include verification of position information, parameters of the H(e)NB, the parameters of the CN, the parameters of a Radio Access Network (RAN) and the parameters of a Radio Frequency (RF); in addition, the HeNB can be directly connected with the CN without being through the H(e)NB GW.

FIG. 3 shows a diagram illustrating network architecture of a wireless Relay in the prior art; the Relay is a wireless network node which can solve the problem of coverage and capacity of the cellular wireless communication system; in the cellular wireless communication system, the coverage of the wireless network of the fixed base station network is limited due to various factors, for example, coverage leakages cannot be avoided in the coverage of the wireless network as the wireless signals are blocked by various building structures; in the marginal areas of the cell, due to the weakening of strength of the wireless signals and the interference of adjacent cells, the UE has worse communication signal quality and extremely high wireless transmission error rate when being in the margin of the cell. Deployment of the Relay can improve the coverage rate and group mobility of the data rate, temporarily deploy the network, improve the throughput of the marginal areas of the cell and cover new areas; the Relay performs data relay through the wireless links between the Relay and the nodes of other networks; as shown in FIG. 3, the UE which is directly served by the base station is called as the Macro UE, the UE served by the Relay is called as the Relay UE; the Relay UE accesses the Relay via the access link, and the Relay relays the data of the Relay UE on an uplink and a downlink via a backhaul link; at present, the Relay discussed by the 3rd Generation Partnership Project (3GPP) standard organization has all the functions of the Macro eNB, and can independently establish the cell; the Macro eNB which provides the backhaul link for the Relay is called as Donor eNB (DeNB) of the RN; an interface between the RN and the DeNB is called as a Un interface; in the signaling connection, an S1 connection is established between the RN and the DeNB; the DeNB is taken as an S1 proxy of the RN, and provides the RN a control plane signaling connection and a user plane signaling connection (S1-C, S1-U) between the RN and the CN via the S1 connection between the DeNB and the CN; the RN performs attachment as the identity of the UE, acquires the Packet Data Network (PDN) connection, establishes the service layer connection with the RN's own Operation Administration and Maintenance (OAM) based on the PDN connection, and loads the configuration parameters.

With the development of the cellular wireless communication technology, a concept of a Close Subscriber Group (CSG) is introduced; the CSG refers to a group of subscription UEs, wherein each subscription UE is allowed to access one or more specific cells through three access modes: a closed access mode, an open access mode and a hybrid access mode; wherein, the closed access mode refers to a mode in which the UE is allowed to access if the CSG ID of the UE is the same as the CSG ID of the access network element; the open access mode refers to a mode in which any UE is allowed to access; and the hybrid access mode refers to a mode in which the UE can be allowed to access no matter whether the UE is the subscriber of the CSG or not, but the subscription UE of the CSG can preferentially access. Moreover, the concept of the CSG is also introduced into the mobility management of the UE; the CSG information of the cell that the UE currently accesses includes the CSG ID of the access network element that the UE currently accesses, the access mode of the UE, and the CSG membership indication of the UE. When the UE accesses the CN by attaching, or performs handover, the CN needs to acquire the CSG information subscribed by the UE via a Home Subscriber Server (HSS); in the normal conditions, the CSG information subscribed by the UE is a CSG Allowed List of the UE; the CSG information of the cell that the UE currently accesses can be acquired via the UE and an access side.

Due to the demand of mobility management, session management, charging and the like, the CN needs to be notified in time when the CSG information of the cell that the UE currently accesses changes. In a Long Term Evolution (LTE) system, when the CSG information of the cell that the UE currently accesses changes, the CN of the LTE system provides different services for the user according to the different CSG information of the cell that the UE currently accesses; a mobile management module of the CN needs to update the mobility management context of the UE; a session management module of the CN needs to update the information such as Quality of Service (QoS) of the UE and the like according to the CSG information of the cell that the UE currently accesses; and a charging module of the CN needs to adopt a new charging strategy according to the CSG information of the cell that the UE currently accesses. When it is required to perform access control on the UE and perform identity authentication on the subscription UE, whether the CN needs to participate is determined according to the different handover scenarios. For example, under the S1 interface, if the CN does not participate in the handover process, the CN cannot be notified; under the direct interface, the handover is completed between two access network elements which establish the direct interfaces, and the CN also cannot be notified; the direct interface is an interface which is established between the two access network elements, such as an X2 interface in the LTE system and an Iuh interface in a Universal Mobile Telecommunications System (UMTS). Similarly, the above problem also exists in the UMTS. Because of the existence of the problem, when the CN does not participate in the handover process, the CN cannot be notified in time, the mobile management module of the CN also adopts the original mobility management context of the user, the session management module of the CN also provides the service according to the original information such as QoS of the UE and the like, and the charging module of the CN also adopts the original charging strategy according to the original CSG information of the cell that the UE currently accesses, thereby, poor user experience and economic loss are caused to the user.

SUMMARY

In view of the above problem, the disclosure aims to provide a method and system for notifying update information to a CN, which can notify the CN the CSG information of the cell that the UE currently accesses when the CN does not participate in the handover process.

In order to achieve the purpose, the technical solutions of the disclosure are realized as follows.

The disclosure provides a method for notifying update information to a CN, including:

a target access network element sends Close Subscriber Group (CSG) information of a cell that a User Equipment (UE) currently accesses to the CN after the UE is handed over from a source access network element to the target access network element; or the UE sends the CSG information of the cell that the UE currently accesses to the CN after receiving an instruction from the target access network element.

In the method, the source access network element and the target access network element may be respectively any type of access network elements supported by a Long Term Evolution (LTE) system; or the source access network element and the target access network element may be respectively any type of access network elements supported by a Universal Mobile Telecommunications System (UMTS).

In the method, the method may further include: the CN stores the CSG information of the cell that the UE currently accesses.

In the method, content of the CSG information of the cell that the UE currently accesses may be empty; or the content of the CSG information of the cell that the UE currently accesses may be an access mode of the target access network element; or the content of the CSG information of the cell that the UE currently accesses may be a CSG ID of the target access network element; or the content of the CSG information of the cell that the UE currently accesses may be the access mode of the target access network element and the CSG ID of the target access network element; or the content of the CSG information of the cell that the UE currently accesses may be the access mode of the target access network element, the CSG ID of the target access network element and an access identity of the UE on the target access network element.

In the method, the target access network element sending the CSG information of the cell that the UE currently accesses may include:

the target access network element sends an S1 signaling message or an Iu signaling message to the CN;

wherein, the S1 signaling message and the Iu signaling message include an identification of the UE and the CSG information of the cell that the UE currently accesses;

wherein, the S1 signaling message is a Path Switch Request, or a Handover Notify or a new S1 signaling message;

wherein, the Iu signaling message is an Iu signaling message in which a Routing Area Update (RAU) message is packaged or a new Iu signaling message.

In the method, sending the CSG information of the cell that the UE currently accesses to the CN by the UE after receiving the instruction from the target access network element may include:

the target access network element sends a Radio Resource Control (RRC) signaling message to the UE; and the UE sends a Non Access Stratum (NAS) signaling message to the CN after receiving the RRC signaling message from the target access network element;

wherein, the NAS signaling message includes an identification of the UE and the CSG information of the cell that the UE currently accesses.

The disclosure also claims a system for notifying update information to a Core Network (CN), the system includes:

a target access network element configured to send Close Subscriber Group (CSG) information of a cell that a User Equipment (UE) currently accesses to the CN after the UE is handed over from a source access network element to the target access network element; or a target access network element configured to send an instruction to a UE, and the UE configured to send CSG information of a cell that the UE currently accesses to the CN after receiving the instruction from the target access network element.

The system may further include:

a CN, configured to receive and store the CSG information of the cell that the UE currently accesses, which is sent by the target access network element or the UE.

In the system, the source access network element and the target access network element may be respectively any type of access network elements supported by a Long Term Evolution (LTE) system; or the source access network element and the target access network element may be respectively any type of access network elements supported by a Universal Mobile Telecommunications System (UMTS).

In the system, content of the CSG information of the cell that the UE currently accesses may be empty; or the content of the CSG information of the cell that the UE currently accesses may be an access mode of the target access network element; or the content of the CSG information of the cell that the UE currently accesses may be CSG ID of the target access network element; or the content of the CSG information of the cell that the UE currently accesses may be the access mode of the target access network element and the CSG ID of the target access network element; or the content of the CSG information of the cell that the UE currently accesses may be the access mode of the target access network element, the CSG ID of the target access network element and an access identity of the UE on the target access network element.

In the method and system for notifying update information to a CN provided by the disclosure, a target access network element sends CSG information of a cell that a UE currently accesses to the CN after the UE is handed over from a source access network element to the target access network element; or the UE sends the CSG information of the cell that the UE currently accesses to the CN after receiving an instruction from the target access network element. therefore the disclosure simply and effectively realized that the CN can still acquire the CSG information of the cell that the UE currently accesses in the condition of not participating in the handover process of the UE, thus the CN can update the CSG information of the cell that the UE currently accesses in time, provide accurate service for the user according to the updated CSG information of the cell that the UE currently accesses, and provide excellent experience for the user.

BRIEF DESCRIPTION OF THE DRAWINGS

FIG. 3 shows a diagram illustrating network architecture of a wireless Relay in the prior art;

FIG. 4 shows a schematic flowchart for implementing a method for notifying update information to a CN according to the disclosure;

DETAILED DESCRIPTION

The disclosure can be applied in the LTE system and the UMTS, and the basic principle is that: after the UE is handed over from a source access network element to a target access network element, the target access network element sends the CSG information of a cell that the UE currently accesses to the CN; or, after receiving an indication from the target access network element, the UE sends the CSG information of the cell that the UE currently accesses to the CN.

The disclosure is further described in detail below with reference to the drawings and embodiments.

The disclosure provides a method for notifying update information to a CN; FIG. 4 shows a schematic flowchart for implementing a method for notifying update information to the CN according to the disclosure; as shown in FIG. 4, the method includes the following steps.

Step 401: after the UE is handed over from the source access network element to the target access network element, the target access network element sends the CSG information of the cell that the UE currently accesses to the CN; or, after receiving the indication from the target access network element, the UE sends the CSG information of the cell that the UE currently accesses to the CN;

specifically, the access network element includes an HeNB, an HNB, an evolved NodeB (eNB), a Radio Network Controller (RNC) and a Relay and the like; wherein, the HeNB, the eNB and the Relay belong to the LTE system; the HNB and the RNC belong to the UMTS; the CN in the LTE system is an Mobility Management Entity (MME), and the CN in the UMTS is a Serving GPRS Support Node (SGSN) or a Mobile Switching Center (MSC).

Step 402: the CN stores the CSG information of the cell that the UE currently accesses.

Embodiment 1

Figure 1:
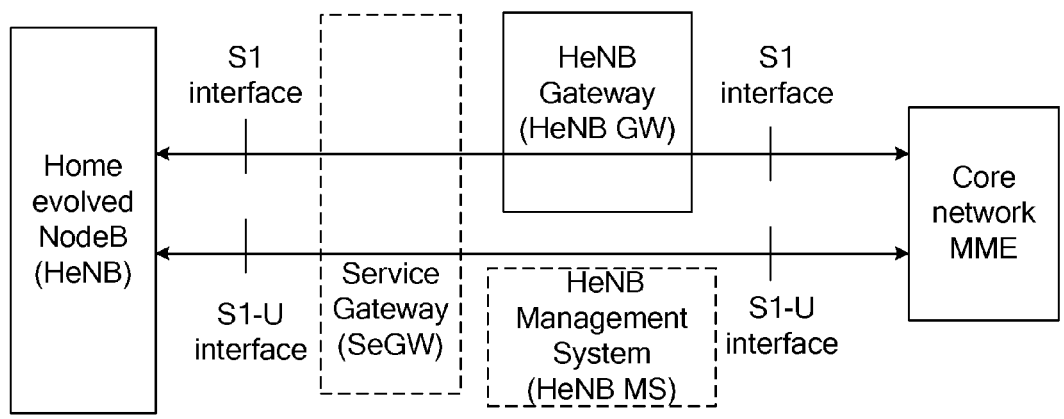
FIG. 1 shows a schematic diagram illustrating network topology of an LTE system in the prior art.
Figure 2:
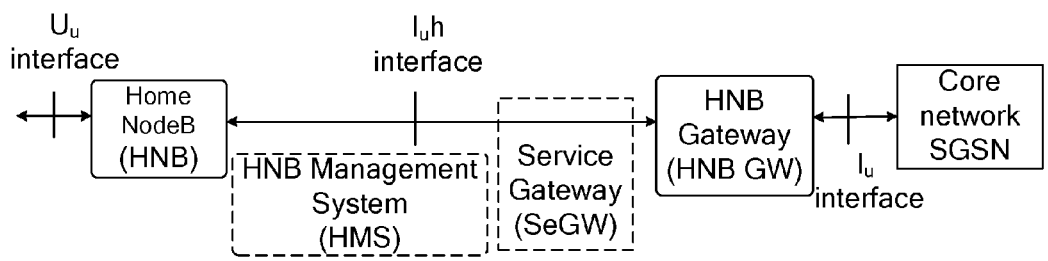
FIG. 2 shows a schematic diagram illustrating network topology of a UMTS in the prior art.
Figure 5:
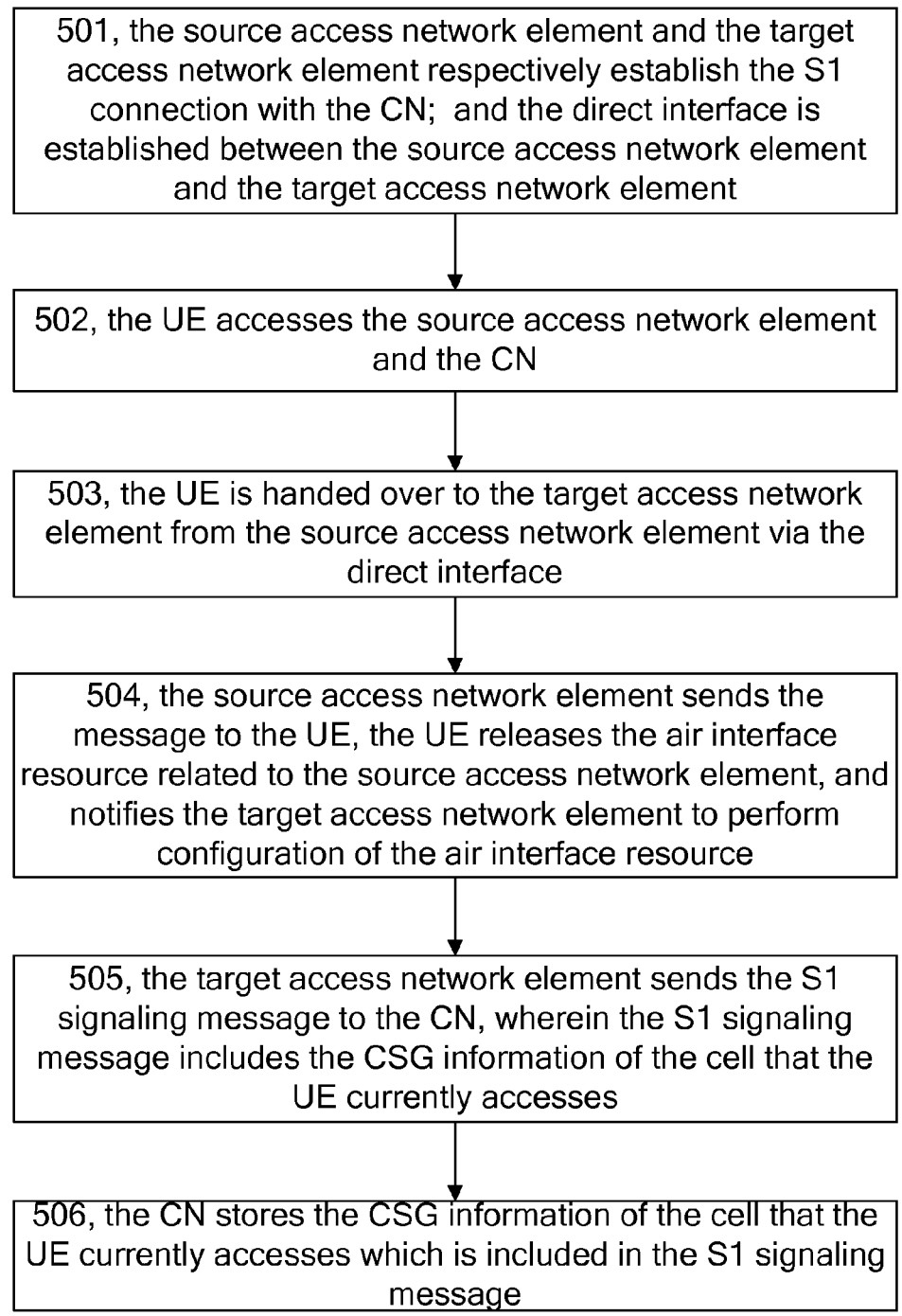
FIG. 5 shows a schematic flowchart of Embodiment 1 for implementing a method for notifying update information to a CN according to the disclosure.

The application scenario of the embodiment is that: under the LTE system, the handover is performed between the source access network element and the target access network element via a direct interface, and the update information is notified to the CN through an S1 signaling message; wherein, the source access network element and the target access network element respectively can be any type of the access network elements supported by the LTE system, such as the HeNB, eNB, Relay and the like;

FIG. 5 shows a schematic flowchart of Embodiment 1 for implementing a method for notifying update information to a CN according to the disclosure; as shown in FIG. 5, the method includes the following steps.

Step 501: the source access network element and the target access network element respectively establish the S1 connection with the CN; and the direct interface is established between the source access network element and the target access network element;

specifically, the source access network element and the target access network element perform the establishment flows of initiating the S1 connection to the CN, if the source access network element or the target access network element is an HeNB which is connected to the CN via the HeNB GW, the source access network element or the target access network element initiates the establishment flow of the S1 connection to the HeNB GW connected therewith; if the HeNB GW does not establish the S1 connection with the CN, the establishment flow of the S1 connection is initiated to the CN, so as to establish the S1 connection; if the source access network element or the target access network element is a Relay which is connected to the CN via the DeNB, the source access network element or the target access network element initiates the establishment flow of the S1 connection to the DeNB connected with the source access network element or the target access network element; if the DeNB does not establish the S1 connection with the CN, the establishment flow of the S1 connection is initiated to the CN, so as to establish the S1 connection; if the source access network element or the target access network element is an eNB, the source access network element or the target access network element directly initiates the establishment flow of the S1 connection to the CN;

through the mode of static configuration or dynamic address acquisition, the direct interface is established between the source access network element and the target access network element; wherein, the static configuration refers that the configuration information of the direct interface is respectively and directly imported on the source access network element and the target access network element; the dynamic address acquisition refers that the source access network element and the target access network element perform the consultation of the configuration information through the establishment flow of the direct interface; the configuration information includes the cell ID of the cell that is served by the access network element, the cell ID of the adjacent cell of the served cell, the identification of the corresponding CN and the identification of the access network element.

Step 502: the UE accesses the source access network element and the CN;

specifically, the UE accesses the source access network element through the mode of attachment or handover or the like; wherein, the mode of attachment refers that the UE sends an access request to the source access network element, so as to realize the air interface connection between the UE and the source access network element; after accessing the source access network element, the UE can access the CN through the mode of attachment, wherein, the mode of attachment refers that the UE sends the attachment message which includes the identification of the UE to the CN through the source access network element; after receiving the message, the CN acquires the CSG information which is subscribed by the UE according to the identification of the UE included in the message, and determines whether the UE is allowed to access the source access network element, if the UE is a legal user, the CN returns the attachment accepting message to the UE and allows the UE to access; if the UE is an illegal user, the CN rejects the UE to access; the handover mode refers that the UE is handed over to the source access network element from other access network elements.

Step 503: the UE is handed over to the target access network element from the source access network element via the direct interface;

specifically, due to the mobility of the UE or change of wireless signal or the like, the UE is located around the border between the cell established by the source access network element and the cell established by the target access network element, and has the trend to move towards the cell established by the target access network element; after detecting the information, the source access network element sends the handover request message to the target access network element through the direct interface, so as to initiate the handover flow to the target access network element; after receiving the handover request message, the target access network element executes access control on the UE according to its own CSG configuration and the CSG information subscribed by the UE which is acquired from the CN or from the source access network element, the method of access control is the prior art of the handover flow, which is not repeated any more; if the target access network element allows the UE to access, the target access network element returns the handover request confirmation message to the source access network element, which represents that the handover request from the source access network element is accepted; after receiving the handover request confirmation message from the target access network element, the source access network element sends information of UE cached by the source access network element to the target access network element; wherein the information of UE includes the context information of the UE and user information of the UE, and the target access network element stores the information of the UE; wherein, the interaction process between the source access network element and the target access network element is realized through the direct interface; the detection method is that: the source access network element configures an adjacent cell measurement function for the UE, the UE sends a measurement report to the source access network element, the source access network element determines whether to handover the UE to the target access network element according to the signal change information of the UE included in the measurement report.

Step 504: the source access network element sends the message to the UE, the UE releases the air interface resource related to the source access network element, and notifies the target access network element to perform configuration of the air interface resource;

specifically, after the UE is handed over from the source access network element to the target access network element, it is also required to release and reconfigure the air interface resource, thereby, the access network element sends the RRC connection and reconfiguration message to the UE; after receiving the message, the UE releases the air interface resource related to the source access network element, such as the radio bearer and the air interface connection and the like which are established between the UE and the source access network element; the UE notifies the target access network element, and the target access network element establishes the radio bearer and air interface connection, and configures the air interface resource such as the identification of the UE and the like; wherein, as the identification of the UE is distributed by the access network element to which the UE belongs, therefore the identification is a temporary identification; after the UE is handed over to the target access network element from the source access network element, the identification of the UE needs to be reconfigured.

Step 505: the target access network element sends the S1 signaling message to the CN, wherein, the S1 signaling message includes the CSG information of the cell that the UE currently accesses;

specifically, after the UE is handed over to the target access network element from the source access network element and the reconfiguration of the air interface resource is completed by the target access network element, the target access network element sends the S1 signaling message to the CN; if the target access network element is an HeNB which is connected to the MME via the HeNB GW, the target access network element sends the S1 signaling message to the HeNB GW connected with the target access network element, the HeNB GW forwards the S1 signaling message to the CN; if the target access network element is a Relay which is connected to the CN through the DeNB, the target access network element sends the S1 signaling message to the DeNB which is connected with the target access network element, then the DeNB forwards the S1 signaling message to the CN; wherein, the S1 signaling message includes the identification of the UE and the CSG information of the cell that the UE currently accesses; the S1 signaling message may be an existing Path Switch Request, a existing Handover Notify and so on, and may also be a new S1 signaling message;

according to the access modes of the target access network element, the CSG information of the cell that the UE currently accesses which is included in the S1 signaling message is different; if there is no CSG attribute, the CSG information of the cell that the UE currently accesses is empty, or indicates that the target access network element has no CSG attributes; if the access mode is an open access mode, the CSG information of the cell that the UE currently accesses is empty, or is the access mode of the target access network element; if the access mode is a closed access mode, the CSG information of the cell that the UE currently accesses includes the CSG ID of the target access network element, or includes the access mode of the target access network element and the CSG ID of the target access network element; if the access mode is a hybrid access mode, the CSG information of the cell that the UE currently accesses includes the access mode of the target access network element, the CSG ID of the target access network element and the access identity of the UE on the target access network element; the access identity of the UE on the target access network element refers to whether the UE is the subscription user of the CSG to which the target access network element belongs.

Step 506: the CN stores the updated CSG information of the user which is included in the S1 signaling message;

specifically, after receiving the S1 signaling message, the CN stores the CSG information of the cell that the UE currently accesses which is included in the S1 signaling message into the memory of the CN; the mobility management module in the CN updates the mobility management context of the UE; the session management module of the CN updates the information such as QoS of the UE and the like according to the CSG information of the cell that the UE currently accesses; the charging module of the CN adopts a new charging strategy according to the CSG information of the cell that the UE currently accesses;

the target access network element sends the message to the source access network element, so as to notify the source access network element to release the S1 interface resource related to the UE.

Embodiment 2

The application scenario of the embodiment is that: under the LTE system, the handover is performed between the source access network element and the target access network element via a direct interface, and the update information is notified to the CN through the Non Access Stratum (NAS) signaling message; wherein, the source access network element and the target access network element respectively can be any type of the access network elements supported by the LTE system, such as the HeNB, eNB, Relay and the like.

Figure 6:
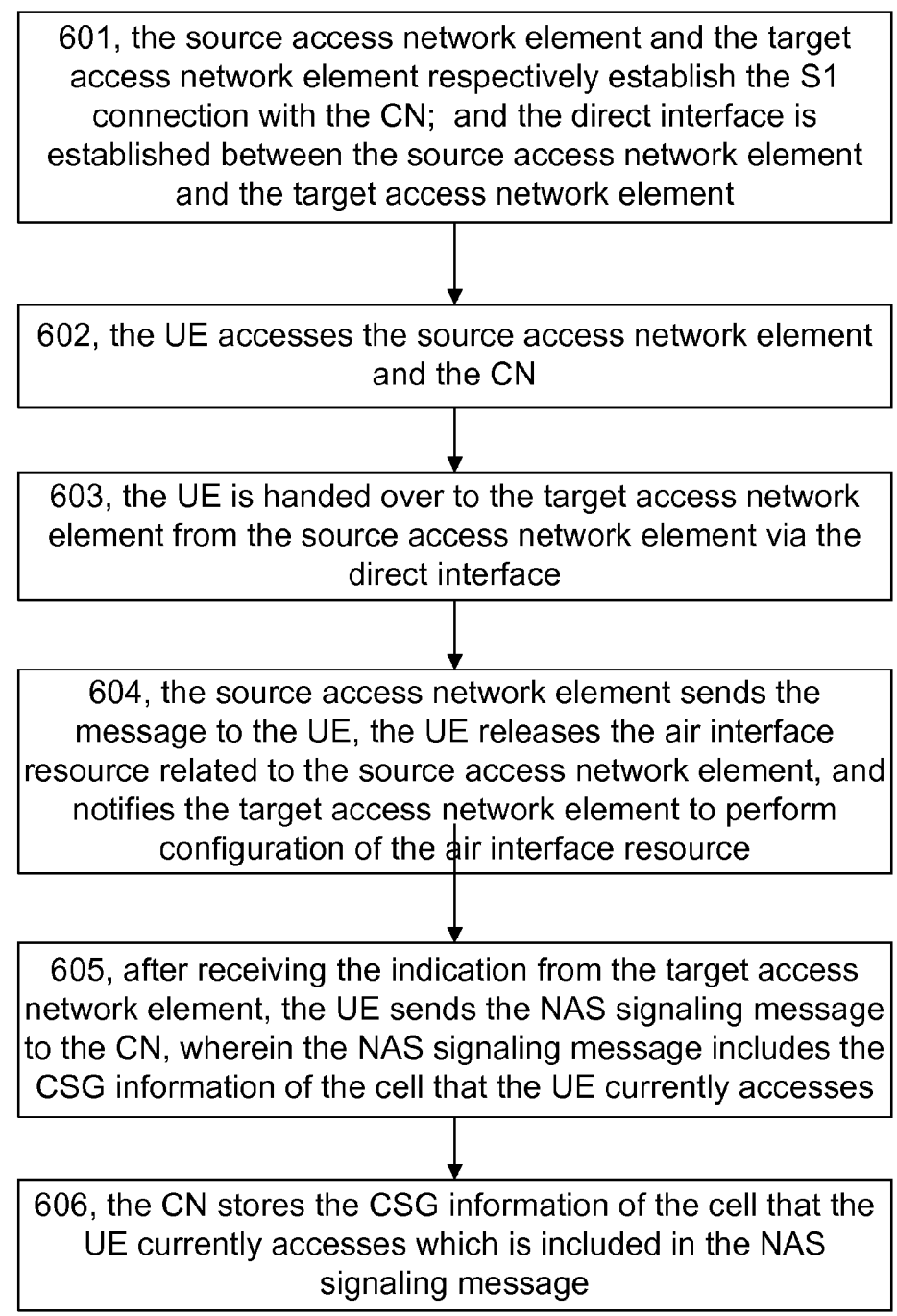
FIG. 6 shows a schematic flowchart of Embodiment 2 for implementing a method for notifying update information to a CN according to the disclosure.

FIG. 6 shows a schematic flowchart of an Embodiment 2 for implementing a method for notifying update information to a CN according to the disclosure; as shown in FIG. 6, the method includes the following steps.

Steps 601-604 are the same as the Steps 501-504.

Step 605: after receiving the indication from the target access network element, the UE sends the NAS signaling message to the CN, wherein, the NAS signaling message includes the CSG information of the cell that the UE currently accesses;

specifically, after the UE is handed over to the target access network element from the source access network element and the reconfiguration of the air interface resource is completed by the target access network element, the target access network element sends the RRC signaling message to the UE; the RRC signaling message can be realized by using the existing downlink indication transmission message, such as the Connection Reconfiguration message and Counter Check message, and also can be realized by using the newly-added RRC signaling message; after receiving the indication from the target access network element, the UE sends the NAS signaling message to the CN, wherein the NAS signaling message includes the identification of the UE and the CSG information of the cell that the UE currently accesses; the NAS signaling message may be an existing Tracking Area Update Request, and also may be a newly-added NAS signaling message; and the content of the CSG information of the cell that the UE currently accesses which is included in the NAS signaling message can refer to the step 505.

Step 606: the CN stores the CSG information of the cell that the UE currently accesses which is included in the NAS signaling message;

specifically, after receiving the NAS signaling message, the CN stores the CSG information of the cell that the UE currently accesses which is included in the NAS signaling message into the memory of the CN; the mobility management module of the CN updates the mobility management context of the UE, the session management module of the CN updates the information such as QoS of the UE and the like according to the CSG information of the cell that the UE currently accesses, the charging module of the CN adopts a new charging strategy according to the CSG information of the cell that the UE currently accesses;

the target access network element sends the message to the source access network element, so as to notify the source access network element to release the S1 interface resource related to the UE.

Embodiment 3

The application scenario of the embodiment is that: under the UMTS, the handover is performed between the source access network element and the target access network element via a direct interface, and the update information is notified to the CN through the Iu signaling message; wherein, the source access network element and the target access network element respectively can be any type of the access network elements supported by the UMTS, such as the HNB, the RNC and the like.

Figure 7:
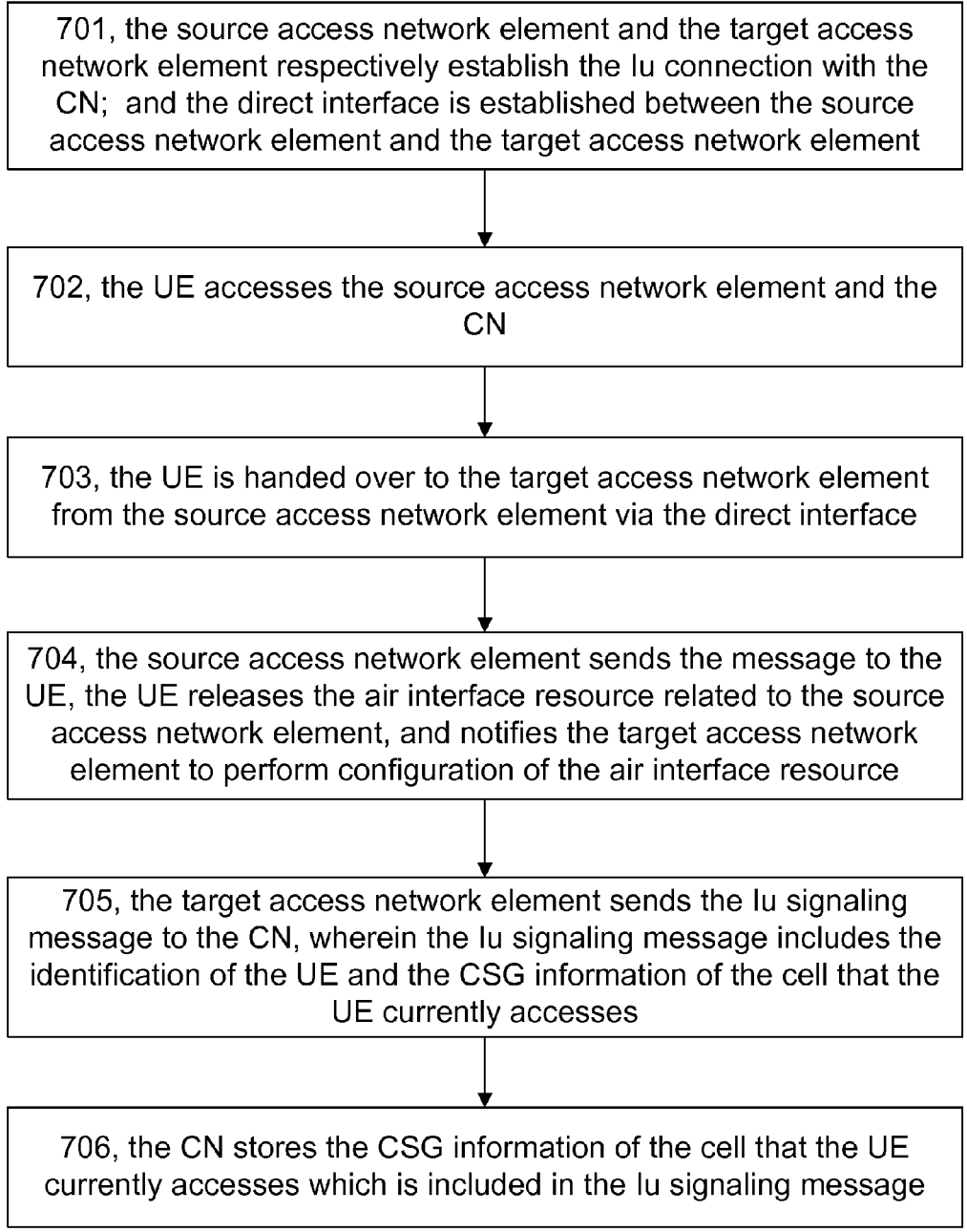
FIG. 7 shows a schematic flowchart of Embodiment 3 for implementing a method for notifying update information to a CN according to the disclosure.

FIG. 7 shows a schematic flowchart of Embodiment 3 for implementing a method for notifying update information to a CN according to the disclosure; as shown in FIG. 7, the method includes the following steps.

Step 701: the source access network element and the target access network element respectively establish the Iu connection with the CN; and the direct interface is established between the source access network element and the target access network element;

specifically, the source access network element and the target access network element acquire the information of the CN according to the configuration of the OAM system and establish the transmission connection, and establish the Iu interface based on the connection; if the source access network element or the target access network element is an HNB which is connected to the CN via the HNB GW, the source access network element and the target access network element also need to register with the HNB GW firstly; the registration process is that: the source access network element and/or the target access network element send/sends the registration message to the HNB GW which is connected therewith, wherein, the registration message includes the ID of the access network element, the CSG ID and the cell ID of the cell served by the access network element; the HNB GW returns the registration accepting message to the access network element after receiving the registration message, which represents that the HNB GW accepts the registration of the access network element;

according to the modes of static configuration or dynamic address acquisition, the direct interface is established between the source access network element and the target access network element; wherein, the static configuration refers that the configuration information of the direct interface is respectively and directly imported on the source access network element and the target access network element; the dynamic address acquisition refers that the source access network element and the target access network element performs the consultation of the configuration information through the establishment flow of the direct interface; the configuration information includes the cell ID of the cell that is served by the access network element, the cell ID of the adjacent cell of the served cell, the identification of the corresponding CN and the ID of the access network element.

Step 702: the UE accesses the source access network element and the CN;

specifically, the UE can access the source access network element through the mode of attachment or handover or the like; wherein, the mode of attachment refers that the UE sends the access request to the source access network element, so as to realize the air interface connection between the UE and the source access network element; after accessing the source access network element, the UE can access the CN through the mode of attachment, wherein, the mode of attachment refers that the UE sends the attachment message which includes the identification of the UE to the CN via the source access network element; after receiving the message, the CN acquires the CSG information which is subscribed by the UE according to the identification of the UE included in the message, and determines whether the UE is allowed to access the access network element, if the UE is a legal user, the CN returns the attachment accepting message to the UE and allows the UE to access the CN; if the UE is an illegal user, the CN rejects the UE to access the CN; the handover mode refers that the UE is handed over to the source access network element from other access network elements.

Step 703: the UE is handed over to the target access network element from the source access network element via the direct interface;

specifically, due to the mobility of the UE or change of the wireless signal or the like, the UE is located around the border between the cell established by the source access network element and the cell established by the target access network element, and has the trend to move towards the cell established by the target access network element; after detecting the information, the source access network element sends the Enhanced Relocation Request message to the target access network element via the direct interface, so as to initiate the handover flow to the target access network element; after receiving the Enhanced Relocation Request message, the target access network element sends the enhanced relocation reply message to the source access network element, which represents that the target access network element accepts the handover request from the source access network element; after receiving the enhanced relocation reply message sent by the target access network element, the source access network element sends information of UE cached by the source access network element to the target access network element; wherein the information of UE includes the context information of the UE and user information of the UE, and the target access network element stores the information of the UE; wherein, the interaction process between the source access network element and the target access network element is realized through the direct interface; the detection method is that: the source access network element configures the adjacent cell measurement function for the UE, the UE sends the measurement report to the source access network element, the source access network element determines whether to handover the UE to the target access network element according to the signal change information of the UE included in the measurement report.

Step 704: the source access network element sends the message to the UE, the UE releases the air interface resource related to the source access network element, and notifies the target access network element to perform configuration of the air interface resource;

specifically, after the UE is handed over from the source access network element to the target access network element, it is also required to release and reconfigure the air interface resource, thereby, the source access network element sends the RRC connection and reconfiguration message to the UE; after receiving the message, the UE releases the air interface resource related to the source access network element, such as the radio bearer and the air interface connection and the like which are established between the UE and the source access network element; the UE notifies the target access network element, and the target access network element establishes the radio bearer and air interface connection, and configures the air interface resource such as the identification of the UE and the like; wherein, as the identification of the UE is distributed by the access network element to which the UE belongs, therefore the identification is a temporary identification; after the UE is handed over to the target access network element from the source access network element, the identification of the UE needs to be reconfigured.

Step 705: the target access network element sends the Iu signaling message to the CN, wherein, the Iu signaling message includes the identification of the UE and the CSG information of the cell that the UE currently accesses;

specifically, after the UE is handed over to the target access network element from the source access network element and the reconfiguration of the air interface resource is completed by the target access network element, the target access network element sends the Iu signaling message to the CN; if the target access network element is an HNB which accesses the CN via the HNB GW, the target access network element sends the Iu signaling message to the HNB GW which is connected with the target access network element, the Iu signaling message includes the identification of the UE and the CSG information of the cell that the UE currently accesses; the HNB GW forwards the Iu signaling message to the CN; the Iu signaling message can be an Iu signaling message in which a Routing Area Update (RAU) message is packaged, such as a Relocation Detect message, and also may be a new Iu signaling message;

the identification of the UE and the content of the CSG information of the cell that the UE currently accesses which are included in the Iu signaling message can refer to the step 505.

Step 706: the CN stores the CSG information of the cell that the UE currently accesses which is included in the Iu signaling message;

specifically, after receiving the Iu signaling message, the CN stores the CSG information of the cell that the UE currently accesses which is included in the Iu signaling message into the memory of the CN; the mobility management module in the CN updates the mobility management context of the UE; the session management module of the CN updates the information such as QoS of the UE and the like according to the CSG information of the cell that the UE currently accesses; the charging module of the CN adopts a new charging strategy according to the CSG information of the cell that the UE currently accesses;

the target access network element sends the message to the source access network element, so as to notify the source access network element to release the Iu interface resource related to the UE.

Embodiment 4

The application scenario of the embodiment is that: under the UMTS, the handover is performed between the source access network element and the target access network element via a direct interface, and the update information is notified to the CN through the NAS signaling message;

wherein, the source access network element and the target access network element respectively can be any type of the access network elements supported by the UMTS, such as the HNB, the RNC and the like.

Figure 8:
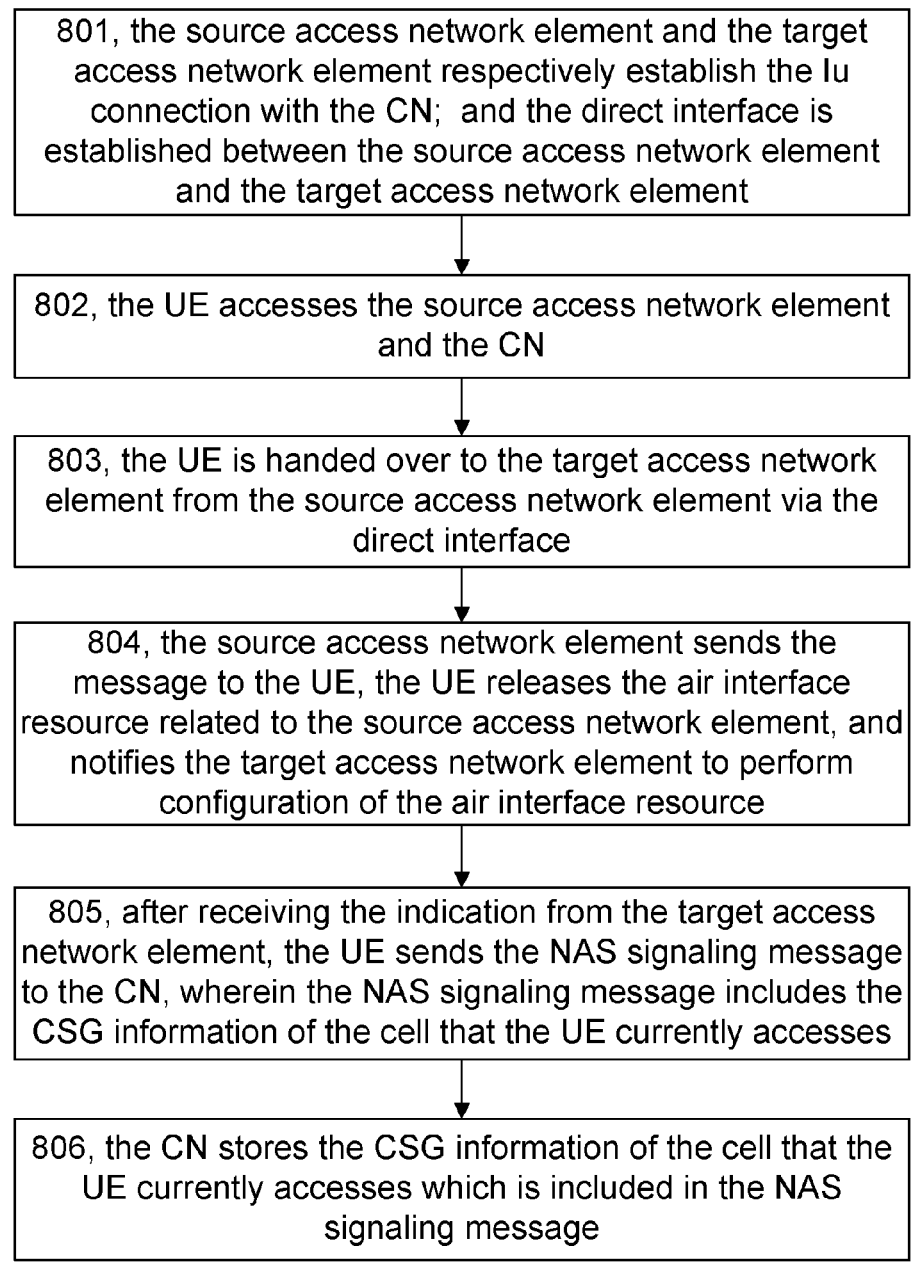
FIG. 8 shows a schematic flowchart of Embodiment 4 for implementing a method for notifying update information to a CN according to the disclosure.

FIG. 8 shows a schematic flowchart of Embodiment 4 for implementing a method for notifying update information to a CN according to the disclosure; as shown in FIG. 8, the method includes the following steps.

Steps 801-804 can refer to steps 701-704.

Step 805: after receiving the indication from the target access network element, the UE sends the NAS signaling message to the CN, wherein, the NAS signaling message includes the CSG information of the cell that the UE currently accesses;

specifically, after the UE is handed over to the target access network element from the source access network element and the reconfiguration of the air interface resource is completed by the target access network element, the target access network element sends the RRC signaling message to the UE; the RRC signaling message can be realized by using the existing downlink indication transmission message, and also can be realized by using the new RRC signaling message; after receiving the indication from the target access network element, the UE sends the NAS signaling message to the CN, wherein the NAS signaling message includes the identification of the UE and the CSG information of the cell that the UE currently accesses; the NAS signaling message may be a Routing Area Update (RAU) message, and also may be a newly-added NAS signaling message;

the content of the CSG information of the cell that the UE currently accesses which is included in the NAS signaling message can refer to the step 505.

Step 806: the CN stores the CSG information of the cell that the UE currently accesses which is included in the NAS signaling message;

specifically, after receiving the NAS signaling message, the CN stores the CSG information of the cell that the UE currently accesses which is included in the NAS signaling message into the memory of the CN; the mobility management module of the CN updates the mobility management context of the UE, the session management module of the CN updates the information such as QoS of the UE and the like according to the CSG information of the cell that the UE currently accesses; the charging module of the CN adopts a new charging strategy according to the CSG information of the cell that the UE currently accesses;

the target access network element sends the message to the source access network element, so as to notify the source access network element to release the Iu interface resource related to the UE.

Figure 9:
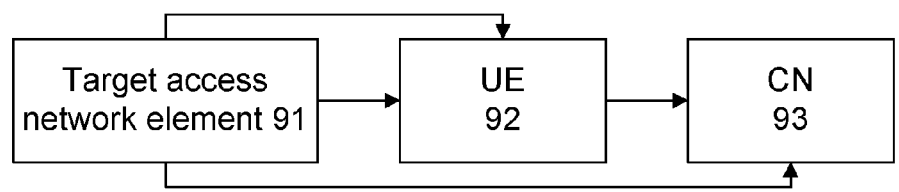
FIG. 9 shows a schematic diagram illustrating structure of a system for notifying update information to a CN according to the disclosure.

In order to realize the method, the disclosure also provides a system for notifying update information to a CN; FIG. 9 shows a schematic diagram illustrating structure of a system for notifying update information to a CN according to the disclosure; as shown in FIG. 9, the system includes a target access network element 91, or the system includes a target access network element 91 and a UE 92; wherein, the target access network element 91 is configured to send the CN the CSG information of the cell that the UE currently accesses after the UE 92 is handed over to the target access network element from the source access network element; or the target access network element 91 is configured to send an instruction to the UE 92, and the UE 92 is configured to send the CN the CSG information of the cell that the UE currently accesses after receiving the indication from the target access network element 91.

The system further includes:
a CN 93, configured to receive and store the CSG information of the cell that the UE currently accesses, which is sent by the target access network element 91 or the UE 92.

The source access network element and the target access network element are respectively any type of the access network elements supported by the LTE system; or the source access network element and the target access network element are respectively any type of the access network elements supported by the UMTS.

The content of the CSG information of the cell that the UE currently accesses is empty; or the content of the CSG information of the cell that the UE currently accesses is the access mode of the target access network element; or the content of the CSG information of the cell that the UE currently accesses is the CSG ID of the target access network element; or, the content of the CSG information of the cell that the UE currently accesses is the access mode of the target access network element and the CSG ID of the target access network element; or the content of the CSG information of the cell that the UE currently accesses is the access mode of the target access network element, the CSG ID of the target access network element and the access identity of the UE on the target access network element.

The above is only the preferred embodiments of the disclosure and not intended to limit the scope of protection of the disclosure, and any modifications, equivalent replacements, improvements and the like within the spirit and principle of the disclosure shall fall within the scope of protection of the disclosure.

The invention claimed is:

1. A method for notifying update information to a Core Network (CN), comprising:
sending, by a target access network element, Close Subscriber Group (CSG) information of a cell that a User Equipment (UE) currently accesses to the CN after the UE is handed over from a source access network element to the target access network element; or
sending, by the UE, the CSG information of the cell that the UE currently accesses to the CN after receiving an instruction from the target access network element.

2. The method according to claim 1, wherein,
the source access network element and the target access network element are respectively any type of access network elements supported by a Long Term Evolution (LTE) system; or
the source access network element and the target access network element are respectively any type of access network elements supported by a Universal Mobile Telecommunications System (UMTS).

3. The method according to claim 2, wherein,
content of the CSG information of the cell that the UE currently accesses is empty; or
the content of the CSG information of the cell that the UE currently accesses is an access mode of the target access network element; or
the content of the CSG information of the cell that the UE currently accesses is a CSG ID of the target access network element; or
the content of the CSG information of the cell that the UE currently accesses is the access mode of the target access network element and the CSG ID of the target access network element; or the content of the CSG information of the cell that the UE currently accesses is the access mode of the target access network element, the CSG ID of the target access network element and an access identity of the UE on the target access network element.

4. The method according to claim 2, wherein the sending the CSG information of the cell that the UE currently accesses by the target access network element comprises:
sending, by the target access network element, an S1 signaling message or an Iu signaling message to the CN;
wherein, the S1 signaling message and the Iu signaling message include an identification of the UE and the CSG information of the cell that the UE currently accesses;
wherein, the S1 signaling message is a Path Switch Request, or a Handover Notify or a new S1 signaling message;
wherein, the Iu signaling message is an Iu signaling message in which a Routing Area Update (RAU) message is packaged or a new Iu signaling message.

5. The method according to claim 2, wherein the sending the CSG information of the cell that the UE currently accesses to the CN by the UE after receiving the instruction from the target access network element comprises:
sending, by the target access network element, a Radio Resource Control (RRC) signaling message to the UE; and
sending, by the UE, a Non Access Stratum (NAS) signaling message to the CN after receiving the RRC signaling message from the target access network element;
wherein, the NAS signaling message includes an identification of the UE and the CSG information of the cell that the UE currently accesses.

6. The method according to claim 1, further comprising:
storing, by the CN, the CSG information of the cell that the UE currently accesses.

7. The method according to claim 6, wherein,
content of the CSG information of the cell that the UE currently accesses is empty; or
the content of the CSG information of the cell that the UE currently accesses is an access mode of the target access network element; or
the content of the CSG information of the cell that the UE currently accesses is a CSG ID of the target access network element; or
the content of the CSG information of the cell that the UE currently accesses is the access mode of the target access network element and the CSG ID of the target access network element; or
the content of the CSG information of the cell that the UE currently accesses is the access mode of the target access network element, the CSG ID of the target access network element and an access identity of the UE on the target access network element.

8. The method according to claim 6, wherein the sending the CSG information of the cell that the UE currently accesses by the target access network element comprises:
sending, by the target access network element, an S1 signaling message or an Iu signaling message to the CN;
wherein, the S1 signaling message and the Iu signaling message include an identification of the UE and the CSG information of the cell that the UE currently accesses;
wherein, the S1 signaling message is a Path Switch Request, or a Handover Notify or a new S1 signaling message;
wherein, the Iu signaling message is an Iu signaling message in which a Routing Area Update (RAU) message is packaged or a new Iu signaling message.

9. The method according to claim 6, wherein the sending the CSG information of the cell that the UE currently accesses to the CN by the UE after receiving the instruction from the target access network element comprises:
sending, by the target access network element, a Radio Resource Control (RRC) signaling message to the UE; and
sending, by the UE, a Non Access Stratum (NAS) signaling message to the CN after receiving the RRC signaling message from the target access network element;
wherein, the NAS signaling message includes an identification of the UE and the CSG information of the cell that the UE currently accesses.

10. The method according to claim 1, wherein,
content of the CSG information of the cell that the UE currently accesses is empty; or
the content of the CSG information of the cell that the UE currently accesses is an access mode of the target access network element; or
the content of the CSG information of the cell that the UE currently accesses is a CSG ID of the target access network element; or
the content of the CSG information of the cell that the UE currently accesses is the access mode of the target access network element and the CSG ID of the target access network element; or
the content of the CSG information of the cell that the UE currently accesses is the access mode of the target access network element, the CSG ID of the target access network element and an access identity of the UE on the target access network element.

11. The method according to claim 1, wherein the sending the CSG information of the cell that the UE currently accesses by the target access network element comprises:
sending, by the target access network element, an S1 signaling message or an Iu signaling message to the CN;
wherein, the S1 signaling message and the Iu signaling message include an identification of the UE and the CSG information of the cell that the UE currently accesses;
wherein, the S1 signaling message is a Path Switch Request, or a Handover Notify or a new S1 signaling message;
wherein, the Iu signaling message is an Iu signaling message in which a Routing Area Update (RAU) message is packaged or a new Iu signaling message.

12. The method according to claim 1, wherein the sending the CSG information of the cell that the UE currently accesses to the CN by the UE after receiving the instruction from the target access network element comprises:
sending, by the target access network element, a Radio Resource Control (RRC) signaling message to the UE; and
sending, by the UE, a Non Access Stratum (NAS) signaling message to the CN after receiving the RRC signaling message from the target access network element;
wherein, the NAS signaling message includes an identification of the UE and the CSG information of the cell that the UE currently accesses.

13. A system for notifying update information to a Core Network (CN), comprising:
a target access network element configured to send Close Subscriber Group (CSG) information of a cell that a User Equipment (UE) currently accesses to the CN after the UE is handed over from a source access network element to the target access network element; or
a target access network element configured to send an instruction to a UE, and the UE configured to send CSG information of a cell that the UE currently accesses to the CN after receiving the instruction from the target access network element.

14. The system according to claim 13, further comprising:
a CN configured to receive and store the CSG information of the cell that the UE currently accesses, which is sent by the target access network element or the UE.

15. The system according to claim 14, wherein:
the source access network element and the target access network element are respectively any type of access network elements supported by a Long Term Evolution (LTE) system; or
the source access network element and the target access network element are respectively any type of access network elements supported by a Universal Mobile Telecommunications System (UMTS).

16. The system according to claim 14, wherein:
content of the CSG information of the cell that the UE currently accesses is empty; or
the content of the CSG information of the cell that the UE currently accesses is an access mode of the target access network element; or
the content of the CSG information of the cell that the UE currently accesses is CSG ID of the target access network element; or
the content of the CSG information of the cell that the UE currently accesses is the access mode of the target access network element and the CSG ID of the target access network element; or
the content of the CSG information of the cell that the UE currently accesses is the access mode of the target access network element, the CSG ID of the target access network element and an access identity of the UE on the target access network element.

17. The system according to claim 13, wherein:
the source access network element and the target access network element are respectively any type of access network elements supported by a Long Term Evolution (LTE) system; or
the source access network element and the target access network element are respectively any type of access network elements supported by a Universal Mobile Telecommunications System (UMTS).

18. The system according to claim 13, wherein:
content of the CSG information of the cell that the UE currently accesses is empty; or
the content of the CSG information of the cell that the UE currently accesses is an access mode of the target access network element; or
the content of the CSG information of the cell that the UE currently accesses is CSG ID of the target access network element; or
the content of the CSG information of the cell that the UE currently accesses is the access mode of the target access network element and the CSG ID of the target access network element; or
the content of the CSG information of the cell that the UE currently accesses is the access mode of the target access network element, the CSG ID of the target access network element and an access identity of the UE on the target access network element.

* * * * *